Sept. 9, 1969           J. F. ALEA           3,465,802
FRANKFURTER SLITTER
Filed May 16, 1967
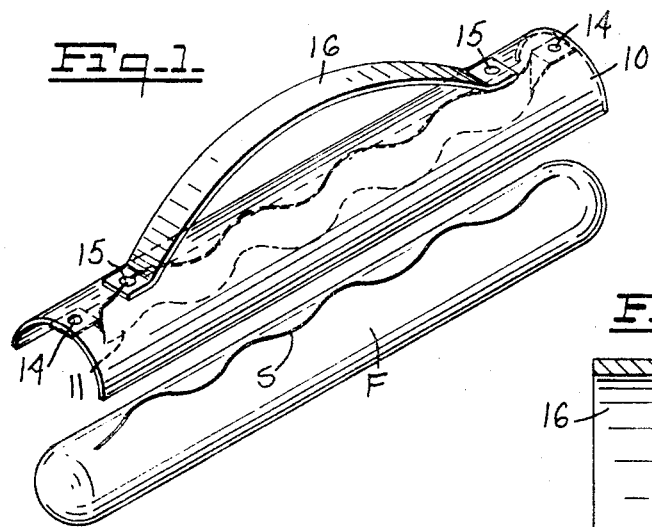
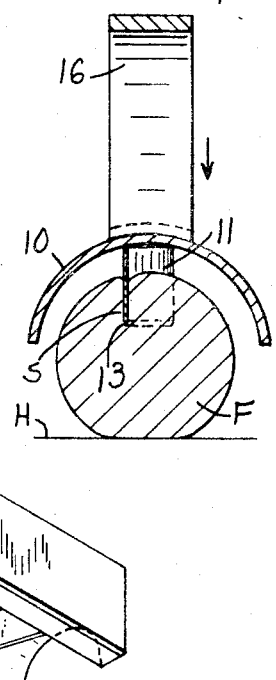
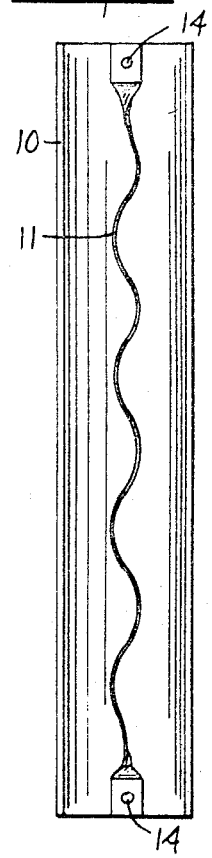
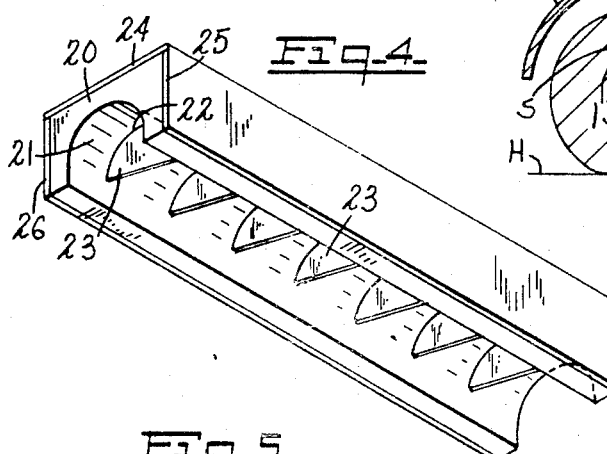
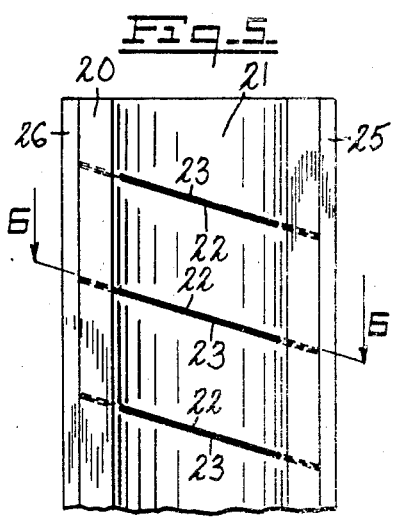
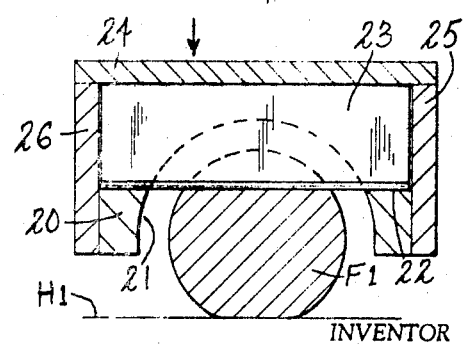
INVENTOR
John F. Alea
BY DeLio and Montgomery
ATTORNEYS United States Patent Office 3,465,802
Patented Sept. 9, 1969

3,465,802
FRANKFURTER SLITTER
John F. Alea, 39 Myrtle Ave., Ansonia, Conn. 06401
Filed May 16, 1967, Ser. No. 638,930
Int. Cl. A47j 43/04; B26b 27/00
U.S. Cl. 146—203                                5 Claims

ABSTRACT OF THE DISCLOSURE

A frankfurter slitter comprising an elongated member defining a semi-cylindrical recess adapted to longitudinally receive a frankfurter therein with the member further having one or a plurality of slitting blades carried within the recess so that the device may be positioned over a frankfurter on a flat surface and moved vertically downward thereon to hold the frankfurter in position while the blade is forming slits therein.

---

This invention relates to frankfurter slitters, and more particularly relates to a manually operated device for slitting the skin of a frankfurter prior to cooking thereof.

It has become common practice in many quarters to provide a series of one or more slits in the skin of a frankfurter prior to cooking. The purpose of such slits is to permit the escape of internal vapors created by heating the frankfurter so that the frankfurter skin will not burst as it is cooked, and further such splitting allows more rapid penetration of the heat to the center of the frankfurter to provide more rapid cooking thereof.

There have previously been proposed a variety of devices of slitting of frankfurters which include devices where the frankfurter is spirally screwed past a cutting edge which provides a helical slit along the length of the frankfurter, and devices where the frankfurter is longitudinally pulled through a tubular device having a blade which provides a longitudinal slit along the length of the frankfurter. Such devices have a common deficiency in that they require two hands for operation, one to hold the device, and the other to manipulate the frankfurter, and further that they may be relatively complex in construction considering the function they are designed to serve.

The present invention provides a new and improved frankfurter slitter where the frankfurter may be laid on a flat surface and a tool embodying the invention is positioned thereover and moved against the surface. The tool is so formed that it retains the frankfurter within the confines thereof while a blade or blades carried by the tool cut slits into the frankfurter.

An object of this invention is to provide a new and improved frankfurter slitter.

Another object of this invention is to provide a new and improved frankfurter slitter which may be operated with one hand.

A further object of the invention is to provide a new and improved frankfurter slitter which retains the frankfurter in a given position while it operates upon the frankfurter to provide slits therein.

The features of the invention which are believed to be novel are set forth with particularity and distinctly claimed in the concluding portion of this specification. The invention, however, both as to its organization and operation, together with further objects and advantages thereof may best be appreciated by reference to the following detailed description taken in conjunction with the drawings, in which:

FIG. 1 is a view in perspective of a tool embodying the invention which is arranged to operate upon a frankfurter;

FIG. 2 is a view of the tool of FIG. 1 seen from the underneath thereof;

FIG. 3 is a vertical section through the center of the tool of FIGS. 1 and 2 taken perpendicular to the length thereof;

FIG. 4 is a view in perspective of another tool embodying the invention;

FIG. 5 is a view of the tool of FIG. 4 seen from the bottom thereof; and

FIG. 6 is a view of the tool of FIGS. 4 and 5 seen in the plane of line 6—6 of FIG. 5.

A tool embodying the invention, in one form thereof, comprises a sheet of metal which is formed in an inverted trough-like shape to provide an elongated member 10 having a generally hemispherical cross-section, as shown in FIG. 3. The length of the member 10 is selected to be substantially the same as most frankfurters, that is, approximately five to six inches. The member 10 defines a generally elongated semi-cylindrical recess adapted to fit over a frankfurter F placed on a horizontal surface H, so when the member 10 is moved downwardly toward the frankfurter F the member 10 confines frankfurter F therein while a blade 11 slits or punctures the skin of the frankfurter as shown by the slit S, FIG. 1. In the device of FIGS. 1, 2 and 3, the slitting blade 12 is preferably formed from a strip of stainless steel with the cutting edge 13 thereof sharpened. The blade 12 in this embodiment is preferably formed in wave-like form for purposes of rigidity. The ends of the blades are turned substantially 90 degrees from the cutting edge thereof and fastened to member 10 as by means of rivets 14 which are ground or polished off. Also riveted to member 10 on the upper convex side thereof, as at 15, is a handle 16. With this arrangement, the frankfurter F may be laid on the horizontal surface H, the handle 16 grasped in one hand by the user, the tool positioned over the frankfurter with the frankfurter within the boundaries of member 10, and the tool depressed to provide the slit S therein. The member 10 overlying the frankfurter and partially surrounding it on opposite sides prevents any slipping or rolling of the frankfurter away from the blade.

It may thus be seen that the tool may be easily manipulated with one hand and the tool itself acts to hold the frankfurter in a position in which it may be slit.

In another embodiment of the invention, the tool body comprises a block of wood or plastic 20 which is formed to define a semi-circular longitudinally extending recess 21. The body member 20 is provided with a plurality of slots 22 transversely of the length thereof which extend downwardly part way through the block. A blade 23 is inserted in each of the slots and locked therein by means of cover pieces 24, 25 and 26 together with the bottom edge 27 of slots 22. The cover pieces may be laminated to the body member in any desired fashion.

In this manner, the cutting blades are rigidly retained in the block 20. Operation of the embodiment of FIGS. 4–6 is as previously described. The frankfurter F1 is laid on a surface H1 and the tool is moved downwardly thereon so that the blades 23 provide a plurality of substantially parallel slits along the length thereof while the body member 20 confines the frankfurter and prevents movement thereof while the blades 23 are acting thereon.

It may thus be seen that the objects of the invention set forth as well as those made apparent from the preceding description are efficiently attained. While preferred embodiments of the invention have been shown for purposes of disclosure, other embodiments of the invention as well as modifications to the disclosed embodiments thereof which do not depart from the spirit and scope of the invention may occur to those skilled in the art. Accordingly, the appended claims are intended to cover all embodiments and modifications which do not depart from the spirit and scope of the invention.

What is claimed is:

1. A hand tool for slitting frankfurters lying on a surface comprising an elongated member having walls defining a generally semi-cylindrical cavity, blade means carried by said member and positioned in said cavity to slit a frankfurter received and retained in said cavity, the cutting edge of said blade means being positioned behind the terminal edges of said walls defining said cavity, said walls defining said cavity being dimensioned and arranged to easily receive a frankfurter therein, as said member is moved downward on a frankfurter on a surface but retain said frankfurter within said cavity when slitting the frankfurter.

2. The hand tool of claim 1 wherein said blade means is longitudinally extending within said cavity.

3. The hand tool of claim 1 wherein said blade means comprises a plurality of blades in substantially parallel relationship extending transversely of the length of said cavity.

4. The hand tool of claim 1 further including a handle on said member positioned on the opposite side of said member from the defined cavity.

5. The tool of claim 2 wherein said blade is secured at opposite ends thereof to said member and said blade is formed in a wave-like fashion along the length thereof.

References Cited

UNITED STATES PATENTS

| | | | |
|---|---|---|---|
| 909,145 | 1/1909 | Brunson. | |
| 2,520,000 | 8/1950 | Dettman | 146—72 |
| 2,810,416 | 10/1957 | Russell | 146—203 X |
| 3,367,379 | 2/1968 | Ryan et al. | 146—72 X |

W. GRAYDON ABERCROMBIE, Primary Examiner

U.S. Cl. X.R.

17—1